Aug. 29, 1933.    L. H. DAVIS    1,924,231
SHOCK ABSORBER
Filed Nov. 20, 1931

Inventor
LEWIS H. DAVIS
By Spencer, Hardman and Fehr
Attorneys

Patented Aug. 29, 1933

1,924,231

UNITED STATES PATENT OFFICE 1,924,231

SHOCK ABSORBER

Lewis H. Davis, Dayton, Ohio, assignor to Delco Products Corporation, Dayton, Ohio, a Corporation of Delaware Application November 20, 1931
Serial No. 576,289

3 Claims. (Cl. 188—88)

This invention relates to improvements in hydraulic shock absorbers and particularly to improvements in the fluid flow control device for such shock absorbers.

It is among the objects of the present invention to provide a shock absorber with a fluid flow control device which is adapted to establish a substantially free flow of fluid in one direction and a restricted flow in the other direction.

Further objects and advantages of the present invention will be apparent from the following description, reference being had to the accompanying drawing wherein a preferred embodiment of one form of the present invention is clearly shown.

Figures 4, 5:
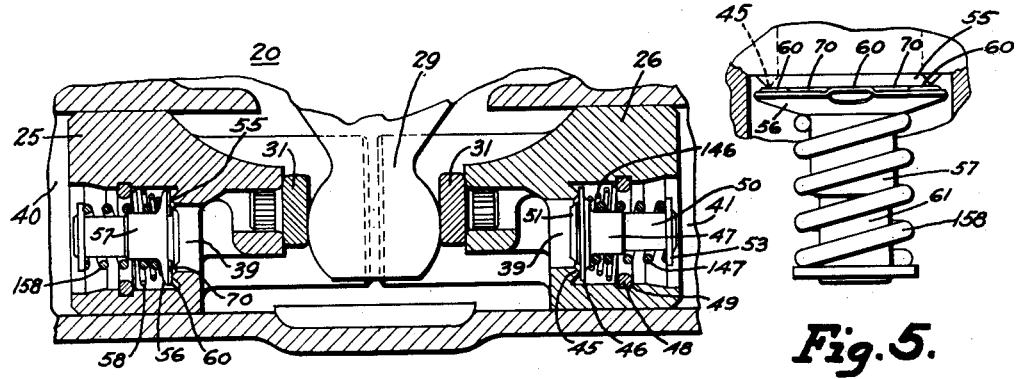
Fig. 4 is a fragmentary sectional view taken substantially on the line 4—4 of Fig. 3.
Fig. 5 is an enlarged, assembly view of the entire fluid flow control device.

Referring to the drawing the numeral 20 designates the shock absorber comprising a casing providing a cylinder 21. The ends of this cylinder are closed by cylinder head caps 22 and 23. Within the cylinder there is provided a piston 24 comprising two piston head portions 25 and 26 which are held together by screw studs 27 and 28. The adjacent ends of the piston head portions 25 and 26 are recessed to receive the piston actuator 29 which is rotatably supported in the casing of the shock absorber and has one end extending outside the shock absorber to which the shock absorber operating arm 30 is attached. Wear pieces 31 are carried by each piston head portion 25 and 26 these wear pieces being engaged by the actuator 29 as shown in Fig. 4.

The free end of the shock absorber operating arm 30 is swivelly secured to one end of a link 32 the opposite end of said link being swivelly attached to a bracket 33 which is secured to the axle 34 of the vehicle by a clamping member 35. The axle 34 supports the vehicle springs 36 which in turn support the vehicle frame 37.

Each piston head portion 25 and 26 has a passage 39 which provides for the transfer of fluid from one side of the piston to the other. Piston head portion 25 forms the compression chamber 40 in the cylinder while piston head portion 26 forms the compression chamber 41 at the opposite end of the cylinder. The compression chamber 40 may be termed the spring compression control chamber, because it controls the compression movements of vehicle springs 36. Chamber 41 is termed the spring rebound control chamber for this chamber controls the rebound movements of vehicle springs 36.

Figure 3:
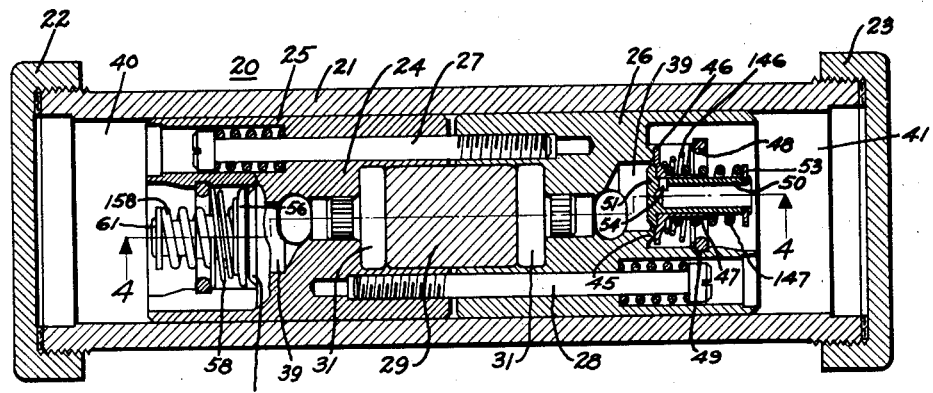
Fig. 3 is a longitudinal sectional view taken through the shock absorber showing the improved fluid flow device applied to the piston of the shock absorber.

Referring to Fig. 3 the passage 39 of piston head portion 26 is provided with an annular valve seat 45 which is engaged by the intake valve comprising a flange 46 and a tubular body portion 47. The flange 46 of this intake valve is yieldably urged into engagement with the valve seat 45 by spring 146 one end of which engages the intake valve the other resting upon a ring 48 seated within a groove 49 within the piston. The tubular portion 47 of the intake valve slidably supports the pressure release valve comprising the tubular body portion 50 and the head portion 51 the latter being urged against the flange 46 of the intake valve by spring 147 one end of which engages the disc valve the other an abutment collar 53 secured at the outer end of the tubular body portion 50 of said pressure release valve. An opening 54 in the tubular portion 50 of the pressure release valve is normally within the confines of the tubular portion 47 of the intake valve and thus is normally closed by said intake valve.

Figure 1:
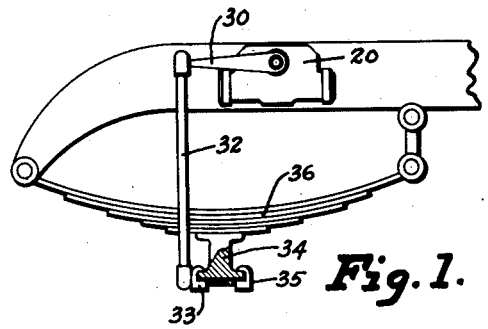
Fig. 1 is a fragmentary side view of a vehicle chassis having a shock absorber embodying the present invention applied thereto.
Figure 2:
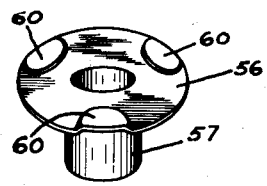
Fig. 2 is a perspective view of the intake valve portion of the improved fluid flow control device.

This valve operates as follows: When the piston head portion 26 moves toward the left as regards Figs. 1 and 3, in response to compression movements of springs 36, fluid from the casing will flow into the passage 39 against the flange 46 of the intake valve and the head 51 of the pressure release valve thus exerting pressure thereon to move the valve assembly away from the valve seat 45 against the effect of spring 146 whereby to establish a substantially free flow of fluid into the spring rebound control chamber 41.

Upon reverse movement of the piston, that is, when the piston moves toward the right in response to rebounding movements of the vehicle springs 36, flange 46 of the intake valve will seat tightly upon the valve seat 45 and thus the fluid flow passing the intake valve at this point will be stopped. As soon as the pressure upon the fluid within the chamber 41 reaches a predetermined value, the pressure release valve will be moved relatively to the intake valve, thus the head portion 51 of the pressure release valve will be moved away from the intake valve and the opening 53 in the tubular body portion of the pressure release valve will be moved outside the confines of the intake valve. Now a flow of fluid will be established from chamber 41 through the tubular body portion 50 and the opening 53 passage 39 into the fluid reservoir.

The structure of the valve mechanism which controls the fluid flow through the duct 39 of the piston head portion 25 differs from the valve structure of the piston head portion 26 in the following manner; the intake valve has a tubular portion 57 similar to the tubular portion 47 of the other valve mechanism. It has a flange 56 similar to the flange 46 of the other valve mechanism, however, flange 56 is provided with spaced humps or raised portions 60 which engage the annular valve seat 55 through the effect of spring 58 urging the intake valve to the said valve seat. By providing the raised portions 60 substantially long thin spaces 70 are provided between the valve and the valve seat which spaces are never closed and which when the piston head portion 25 moves to exert pressure upon the fluid within the chamber 40 will establish sheet-like sprays of restricted fluid flows from said chamber 40 into the passage 39 without movement of the valve flange 56. This fluid flow in a thin sheet-like spray substantially eliminates hissing or whistling noises which are generally set up when a high pressure fluid flow is condensed. If the pressure within the chamber 40 becomes excessive so that it cannot properly be relieved by the fluid flow through spaces 70 when the pressure release valve 61 comparing with the valve comprising portions 50 and 51 is operated against the effect of its spring 158 to establish a flow of fluid through it and its side opening as has been described in connection with the pressure release valve of piston head portion 26.

In the present invention applicant has provided an intake valve which is adapted to establish a free flow of fluid in the shock absorber when the piston operates in one direction and by virtue of the raised portions this intake valve is adapted to establish an initial, restricted flow of fluid as the piston operates in the opposite direction. The height of the raised or hump portions 60 may be varied to vary this initially restricted flow.

While the form of embodiment of the present invention as herein disclosed, constitutes a preferred form, it is to be understood that other forms might be adopted, all coming within the scope of the claims which follow.

What is claimed is as follows:

1. A shock absorber having a cylinder in which a piston is reciprocably supported, said piston having a passage providing for the transfer of fluid from one side of the piston to the other; a valve-seat in the piston; a valve mechanism adapted to control the flow of fluid through said piston passage in both directions said valve mechanism comprising a disc valve having a tubular body portion provided with an outwardly extending flange yieldably urged against the valve-seat, the surface of said flange engaging the valve-seat having spaced humps providing spaces between the valve-flange and valve-seat; and a pressure release valve slidably supported in the tubular body portion of the disc valve.

2. A shock absorber having a cylinder in which a piston is reciprocably supported, said piston having a passage providing for the transfer of fluid from one side of the piston to the other; a valve-seat in the piston; and a valve mechanism adapted to control the flow of fluid through said piston in both directions said valve mechanism comprising an intake valve adapted to establish a substantially free flow of fluid through the piston passage in response to the movement of the piston in one direction and also adapted independently to establish a restricted flow of fluid through the piston passage in response to the movement of the piston in the opposite direction and also comprising a valve carried by the intake valve and adapted to establish a restricted additional flow of fluid through the piston passage in response to a predetermined fluid pressure caused by the movement of the piston in said opposite direction.

3. A shock absorber having a cylinder in which a piston is reciprocably supported, said piston having a passage providing for the transfer of fluid from one side of the piston to the other; a valve-seat in the piston; a valve mechanism adapted to control the flow of fluid through said piston passage in both directions said valve mechanism comprising an intake valve adapted to establish a flow of fluid through the piston passage substantially unrestricted in one direction and restricted in the other direction, said intake valve comprising a tubular body portion provided with an outwardly extending flange having spaced humps; a spring yieldably urging the intake valve into engagement with the valve-seat, the humps of the intake valve providing spaces between the valve-seat and the portions of the valve between adjacent humps; and a pressure release valve in the tubular body portion of the intake valve, movable, relatively to said intake valve, in response to fluid pressure to establish restricted fluid flows through the piston passage in the other direction.

LEWIS H. DAVIS.